United States Patent [19]
Krauss et al.

[11] Patent Number: 5,866,050
[45] Date of Patent: *Feb. 2, 1999

[54] METHOD AND SPINNING APPARATUS HAVING A MULTIPLE-TEMPERATURE CONTROL ARRANGEMENT THEREIN

[75] Inventors: Leland Luper Krauss, Atglen, Pa.; Duncan Douglas McCabe, Wilmington, Del.; Robert Carter Johnstone, Cochranville, Pa.; Robert Carl Boger, Wilmington, Del.

[73] Assignee: E. I. du Pont de Nemours and Company, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 795,881

[22] Filed: Feb. 6, 1997

[51] Int. Cl.$^6$ ............................. B29C 47/92; D01D 1/09; D01D 5/08

[52] U.S. Cl. ................ 264/40.6; 264/176.1; 425/143; 425/144; 425/378.2; 425/379.1; 425/382.2; 425/464

[58] Field of Search ............................ 264/40.6, 176.1; 425/143, 144, 378.2, 379.1, 382.2, 464

[56] References Cited

U.S. PATENT DOCUMENTS

| | | | |
|---|---|---|---|
| 2,692,405 | 10/1954 | Gayler | 425/379.1 |
| 3,360,597 | 12/1967 | Jones et al. | |
| 3,407,437 | 10/1968 | Lenk | 425/464 |
| 3,761,559 | 9/1973 | Heckrotte et al. | 264/237 |
| 3,762,854 | 10/1973 | Kilsdonk | 425/382.2 |
| 3,767,347 | 10/1973 | Landoni | 425/378.2 |
| 3,817,672 | 6/1974 | Lenk | 425/73 |
| 3,830,617 | 8/1974 | Coates et al. | 425/464 |
| 3,881,850 | 5/1975 | Stockbridge | 425/72.2 |
| 4,035,127 | 7/1977 | Ogasawara et al. | 425/192 S |
| 4,061,462 | 12/1977 | Giannarelli et al. | 425/464 |

(List continued on next page.)

FOREIGN PATENT DOCUMENTS

| | | |
|---|---|---|
| 1490169 | 6/1989 | U.S.S.R. |
| 779787 | 7/1957 | United Kingdom |
| 820918 | 9/1959 | United Kingdom |
| 839201 | 6/1960 | United Kingdom |
| 1235338 | 6/1971 | United Kingdom |
| 1296653 | 11/1972 | United Kingdom |
| 2057344 | 4/1981 | United Kingdom |

OTHER PUBLICATIONS

Translation of Japan 7–18,046 (Published Mar. 1, 1995).
Translation of Fed. Rep. of Germany 195 00 502 (published Jul. 11, 1996).
Translation of Japan 6–108,314 (published Apr. 19, 1994).
Translation of Japan 62–62,905 (published Mar. 19, 1987).
Translation of German Patent DE 38 18 017, Published Dec. 15, 1988.

(List continued on next page.)

*Primary Examiner*—Leo B. Tentoni

[57] ABSTRACT

A method and apparatus for spinning filaments of a polymeric material includes a first temperature control arrangement for heating a spin pack to a first predetermined reference temperature greater than the predetermined polymer inlet temperature such that the temperature across a polymer filter holder and the spinneret plate in the spin pack is substantially uniform, whereby the temperature of the filaments emanating from the spinneret plate is substantially uniform. A plate assembly having at least one polymer flow passage therein is disposed between the outlet of the pump and the inlet of the spin pack. A second temperature control arrangement for independently controlling the temperature of the plate assembly to a second predetermined reference temperature is provided. The second predetermined reference temperature is selectable to a temperature above, equal to, or below the predetermined polymer inlet temperature, whereby the temperature of polymer conveyed through the polymer flow passage in the plate assembly is selectably controllable to a predetermined polymer temperature lying within a predetermined range of the second predetermined reference temperature.

17 Claims, 11 Drawing Sheets

U.S. PATENT DOCUMENTS

| | | | |
|---|---|---|---|
| 4,437,827 | 3/1984 | Moderlak et al. | 425/378.2 |
| 4,645,444 | 2/1987 | Lenk et al. | 425/192 S |
| 4,648,826 | 3/1987 | Ogasawara et al. | 425/192 S |
| 4,663,096 | 5/1987 | Uenoyama et al. | 264/40.6 |
| 4,720,251 | 1/1988 | Mallay et al. | 425/67 |
| 4,875,846 | 10/1989 | Reinbold | 425/186 |
| 5,456,828 | 10/1995 | Tersi et al. | 210/184 |
| 5,601,854 | 2/1997 | Schroeder et al. | 425/192 S |
| 5,601,856 | 2/1997 | Kretzschmar et al. | 425/378.2 |

OTHER PUBLICATIONS

Translation of Japan Patent Sho 62–268,807, Published Nov. 21, 1987.

Translation of Japan Patent Sho 48–28,964, Published Sep. 6, 1973.

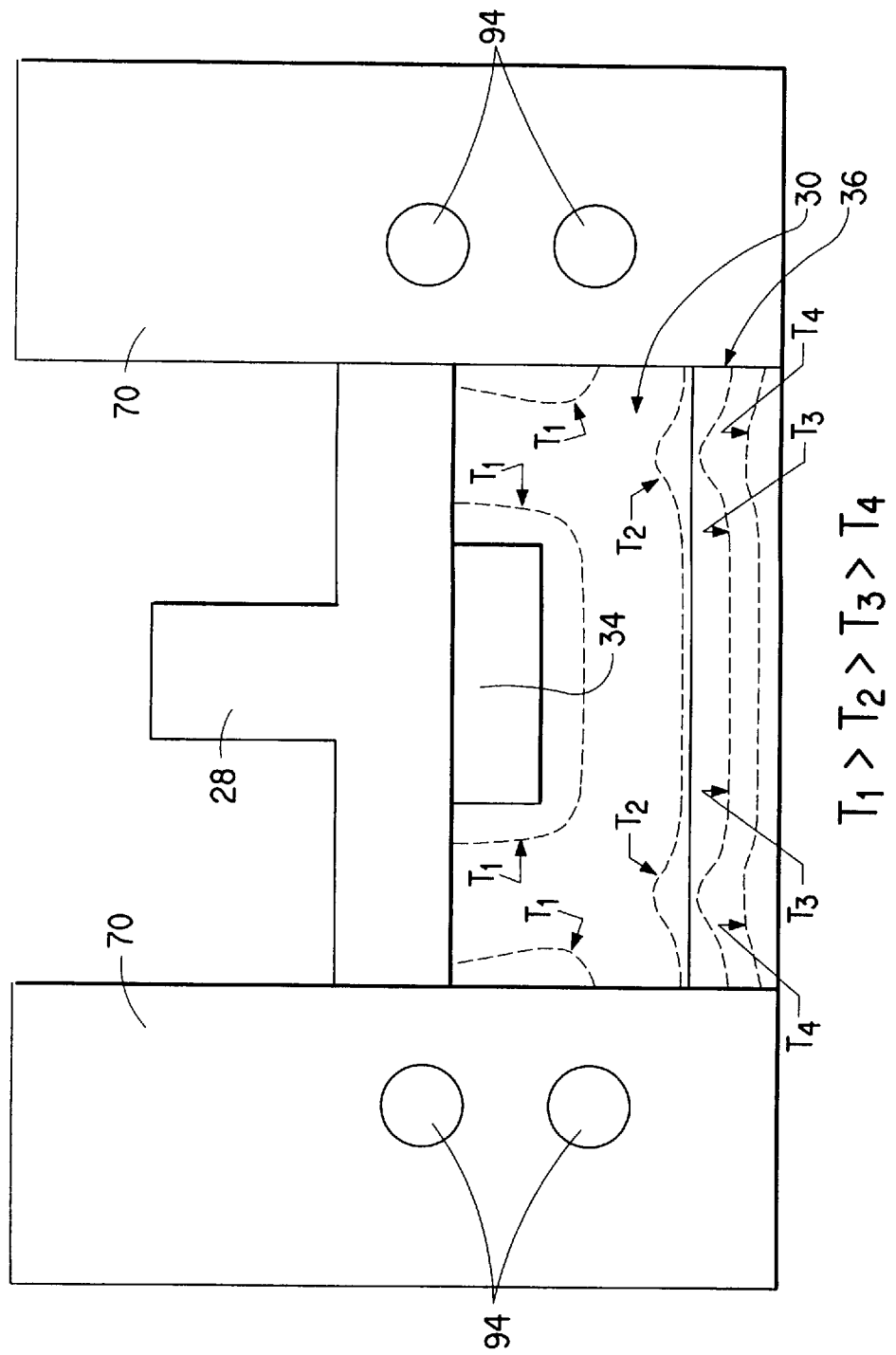

$T_1 > T_2 > T_3 > T_4$

METHOD AND SPINNING APPARATUS HAVING A MULTIPLE-TEMPERATURE CONTROL ARRANGEMENT THEREIN

BACKGROUND OF THE INVENTION

1. Field of the Invention

The present invention relates to an apparatus for spinning filaments from a polymeric material, and more particularly, to a spinning apparatus that has a multiple-temperature control arrangement therein.

2. Description of the Prior Art

Shown in FIG. 1 is a side elevational view, partly in section, of the main functional elements of a spinning apparatus generally indicated by the reference character 10 for spinning fiber filaments from a molten mass of polymeric material, such as nylon polymer. The spinning apparatus 10 is housed in the internal central chamber 12 defined within a hollow-walled casing 14.

Structurally, the spinning apparatus 10 includes a pump 18 mounted on a pump block 20, also known as a "wear plate". The pump block 20 may be supported within the casing 14 by an abutment 22. Depending from the undersurface of the pump block 20 is one or more spin packs, each generally indicated by the reference character 24. Each spin pack 24 is connected to the pump block 20 by one or more mounting bolts 26. Each spin pack 24 is comprised of a pack lid 28, a polymer filter holder 30, and a spinneret plate 36. The filter holder 30 has a central recess 32 therein. The lid 28 and the recess 32 in the filter holder 30 cooperate to define an enclosed pocket in which a polymer filter medium 34, such as sand, is received. The spinneret plate 36 is a relatively massive member that has an array of small, precision bores 36B extending therethrough. The mouths of the bores 36B form an array of orifices that open across the lower surface of the spinneret plate 36.

The pump block 20 has arranged therein one or more internal channels 20C which cooperate to define separate, polymer flow passages that connect the outlet of the pump 18 to the inlet of each spin pack 24 associated with the block 20. The pack lid 28 in each spin pack has an internal passage 28P that leads from the surface of the lid 28 to the pocket in which the filter medium 34 is received. A plurality of smaller internal feeder ducts 30F are provided through filter holder 30 that connect the outlet of the filter 34 with each of the bores 36B extending through the spinneret plate 36. Rails 38 may be provided to protect the face of the spinneret plate 36, if desired During the spinning operation molten polymer is supplied to the pump block 20 through a jacketed polymer feed line 40. Polymer is conveyed through a set of channels (not shown) in the block 20 to the inlet of the pump 18. Polymer is conveyed to the inlet of the pump 18 at a predetermined polymer inlet temperature. The pump 18 forces the polymer under increased pressure through each of the separate polymer passages formed by the channels 20C in the block 20 to a respective one of the spin packs 24 associated with the block 20. The internal channels 20C which form each separate polymer passage are arranged within the pump block 20 in a manner which insures that polymer traversing through each polymer flow passage travels a substantially equal linear distance from the outlet of the pump 18 to a spin pack 24.

The polymer conveyed to a given spin pack 24 is carried through the passage 28P in the pack lid 28 to the filter 34. From the filter 34 the polymer flows through the feeder channels 30F and to the bores 36B in the spinneret plate 36. The polymer as pressurized by the pump 18 is extruded through the bores 36B in the spinneret plate 36, and emanates from the orifices in the face of the spinneret plate 36 as fine filaments of polymeric material.

The hollow interiors 14I of the walls of the casing 14 are interconnected to form a common fluid flow volume that surrounds the internal central chamber 12. The temperature in the chamber 12 in which the elements of the spinning apparatus 10 are disposed is maintained at substantially the predetermined polymer inlet temperature by pumping a gaseous heat exchange fluid through a fluid flow loop that includes the interconnected flow volumes defined within the casing 14. Typically the heat exchange fluid sold by Dow Chemical Company as Dow Therm® is used in the effort to maintain the ambient temperature within the internal chamber 12 of the casing 14 at the desired temperature. In some instances thermal conduction into the pump 18 and the spin pack(s) 24 is enhanced by the use of interengaged wedges 42. The wedges 42 force these elements of the spinning apparatus 10 into intimate contact with the walls of the surrounding casing 14.

FIG. 2 illustrates the thermal experience of the polymeric material forming any given one of the filaments extruded from the face of the spinneret plate 36. The polymer enters the pump 18 at a predetermined polymer inlet temperature $T_{pump\ inlet}$. The action of the pump 18 raises the polymer temperature to a higher level at the pump outlet, $T_{pump\ outlet}$. The polymer is substantially maintained at this temperature as it moves through the separate polymer passages formed by the channels 20C in the pump block 20 to the spin pack 24. As the polymer is forced through the filter medium 34 within each spin pack 24 the shearing and filtering action imparted by the filter medium 34 increases polymer temperature toward a temperature maximum, indicated in FIG. 2 as temperature $T_{filter\ outlet}$. Thereafter, the temperature of the polymer as it moves through each of the feeder channels 30F and through the bores 36B decreases toward the temperature value $T_{spinneret}$ at the face of the spinneret plate 36.

Although the shape of the thermal experience curve for each polymeric filament is the same, the temperature of a filament emanating from an orifice in one region of the face of the spinneret plate 36 may vary from the temperature of a filament emanating from an orifice in a different region of the face of the spinneret plate. For example, the temperature value $T_{spinneret\ 1}$ of a filament emanating from an orifice adjacent a lateral edge of the spinneret plate may be substantially different from the temperature value $T_{spinneret\ 2}$ of a filament emanating from an orifice lying along the central plane of the spinneret plate 36.

The reason for the temperature variation of filaments emanating from different regions across the face of the spinneret plate 36 can be understood from FIG. 3, which is a stylized pictorial representation of the thermal gradient formed within a spin pack 24 As seen in FIG. 3 the filter 34 serves as a heat source lying centrally within the spin pack 24. The local polymer temperature has risen above the surrounding spin pack temperature, and heat flows out from this. The bottom side of the spin pack is an exposed metallic surface, being the highest region of heat loss from the system. The hot polymer is also moving toward this surface, and heat is convected from the hotter filter to the filter holder and the spinneret by the polymer. Therefore, the center region of the spinneret is warmer than its edges., because there is no polymer carrying heat to the edges and they are further removed from the hotter filter region. Conduction of heat between the spin pack and the surrounding spin block casing also impacts the spinneret edge temperature.

These temperature differences in the metal of the spin pack translate to corresponding differences in the polymer temperature as it moves down through the spinneret plate and emerges as filaments from the spinneret face. As the filter medium 34 ages the temperature differences are exacerbated. These filament temperatures differences lead to non-uniform filament properties, which is seen as deleterious.

In view of the foregoing it is believed advantageous to provide a temperature control arrangement for a spinning apparatus that reduces or eliminates temperature variations within the spin pack, and especially across the filter holder and the spinneret plate.

SUMMARY OF THE INVENTION

The present invention is directed toward a method and an apparatus for spinning filaments of a polymeric material. The apparatus is of the type comprising a spin pack including a polymer filter holder and a spinneret plate, the spin pack having a polymer inlet formed therein, and a pump for pumping a polymeric material having a predetermined polymer inlet temperature through the spin pack to cause the polymeric material to emanate as filaments from the spinneret plate. The pump has an outlet port therein.

In accordance with one embodiment of the present invention a first temperature control arrangement is provided for heating the spin pack to a first predetermined reference temperature greater than the predetermined polymer inlet temperature such that the temperature across the polymer filter holder and the spinneret plate is substantially uniform, whereby the temperature of the filaments emanating from the spinneret plate is substantially uniform.

In a second embodiment, a plate assembly disposed between the outlet of the pump and the inlet of the spin pack, the plate assembly having at least one polymer flow passage formed therein through which polymeric material is able to be conveyed from the outlet of the pump to the inlet of the spin pack. This aspect of the invention further includes a second temperature control arrangement for independently controlling the temperature of the plate assembly to a second predetermined reference temperature. The second predetermined reference temperature is selectable to a temperature above, equal to, or below the predetermined polymer inlet temperature, whereby the temperature of polymer conveyed through the polymer flow passage in the plate assembly is selectably controllable to a predetermined polymer temperature lying within a predetermined range of the second predetermined reference temperature.

BRIEF DESCRIPTION OF THE DRAWINGS

The invention will be more fully understood from the following detailed description thereof, taken in connection with the accompanying drawings, which form a part of this application, and in which:

FIGS. 9A and 9B are a stylized pictorial representations each similar to FIG. 3 respectively showing the thermal variations along side and front elevations within the spin pack of a spinning apparatus in accordance with the present invention.

DETAILED DESCRIPTION OF THE INVENTION

Figure 1:
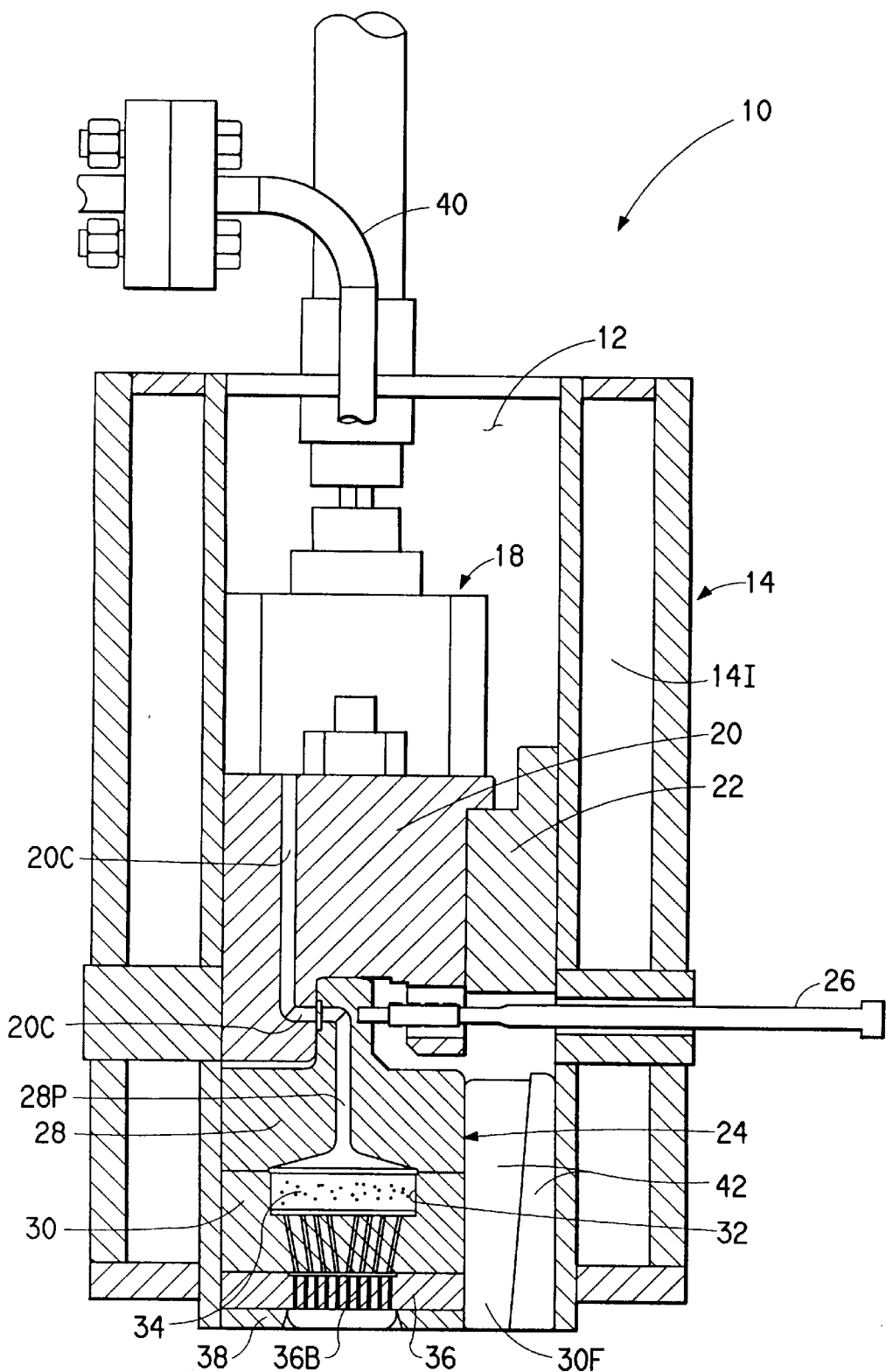
FIG. 1 is a side elevational view, partly in section, of the main functional elements of a prior art spinning apparatus for spinning filaments of a polymeric material.
Figure 2:
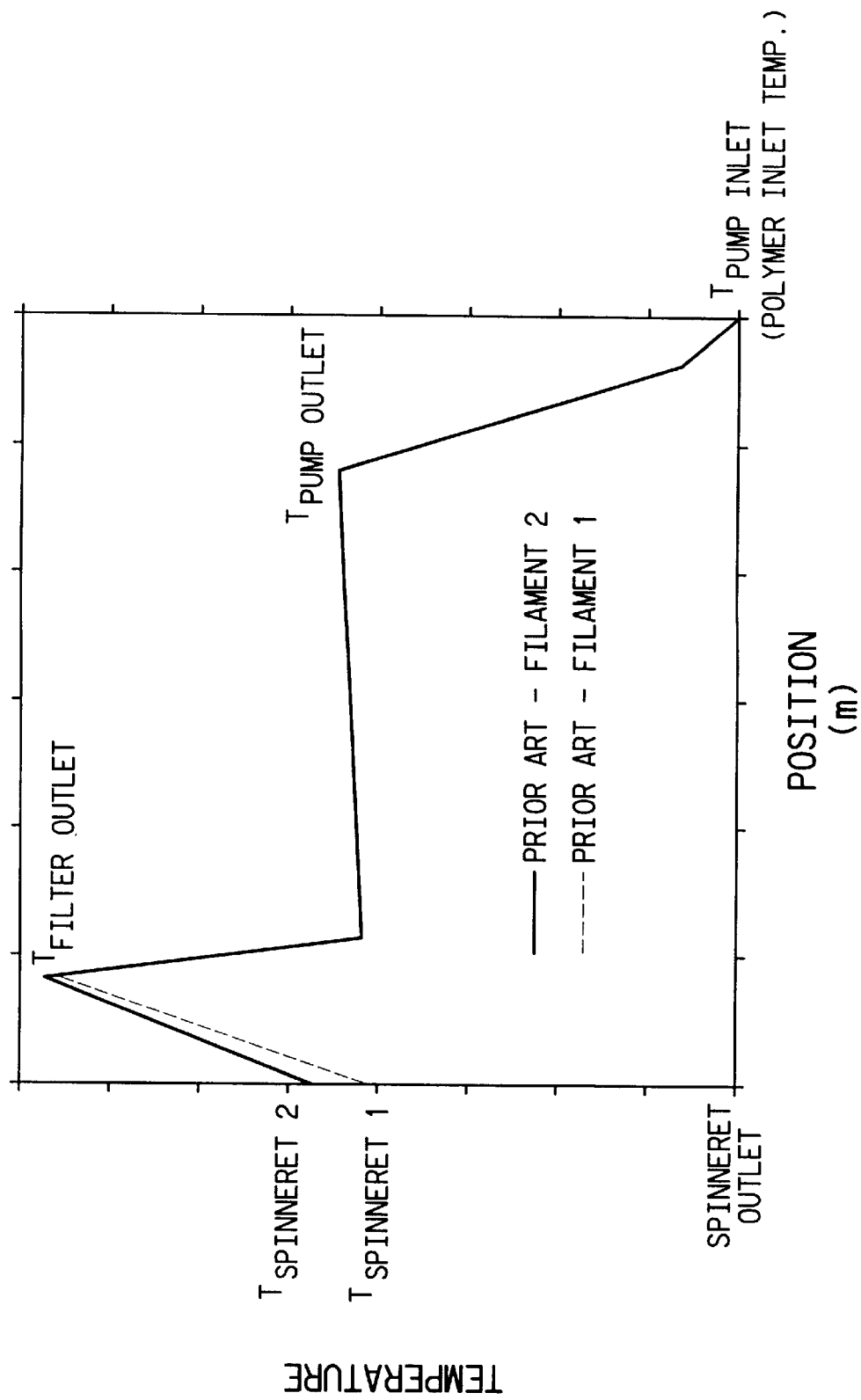
FIG. 2 is a graph illustrating the thermal experience of the polymeric material forming any given one of the filaments extruded from the face of the spinneret plate of the prior art spinning apparatus of FIG. 1.

Throughout the following detailed description, similar reference characters refer to similar elements in all figures of the drawings.

Figure 4:
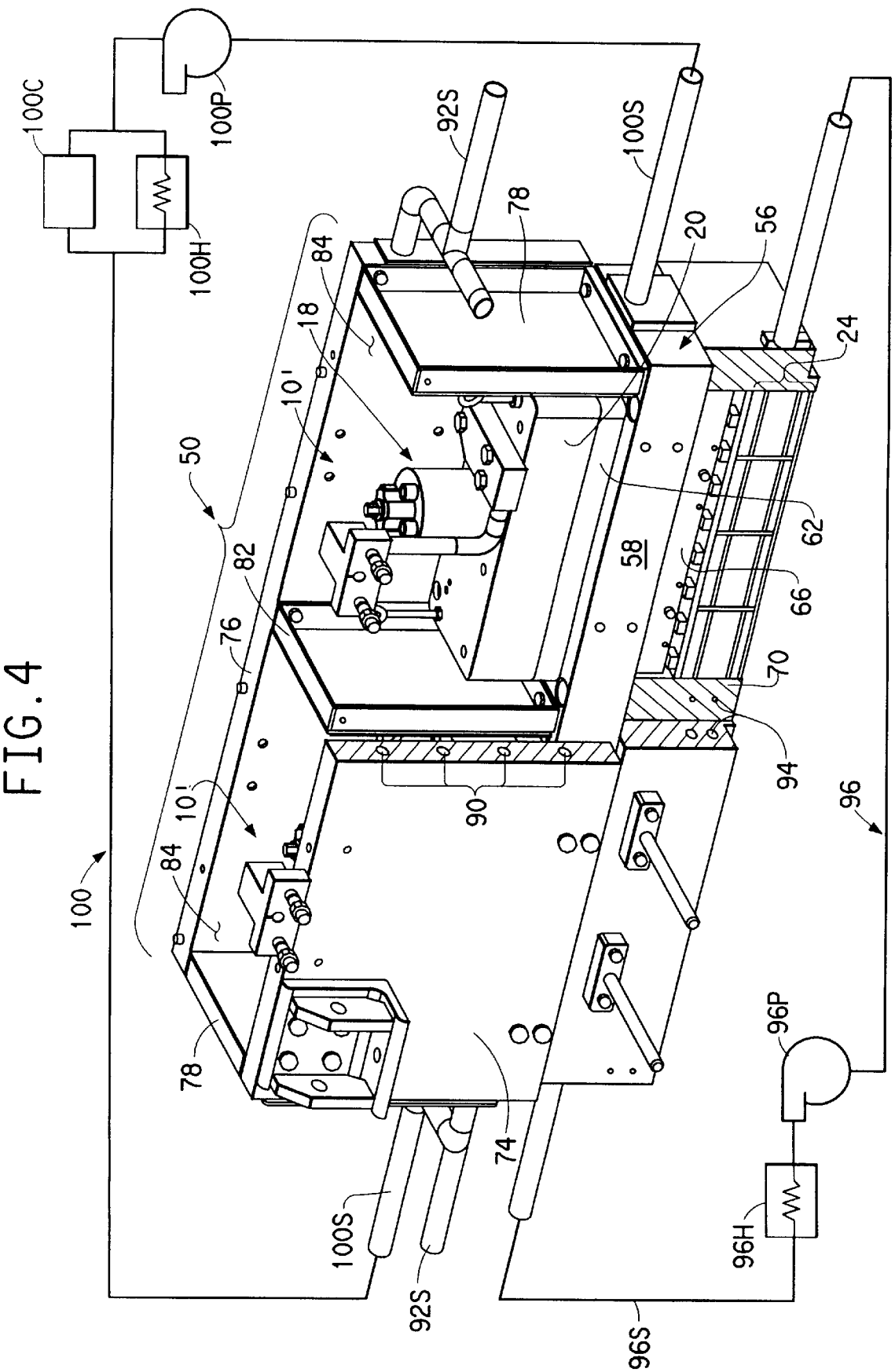
FIG. 4 is a perspective view of a spin assembly installation including two spinning apparatus each having a temperature control arrangement in accordance with the present invention.
Figure 5:
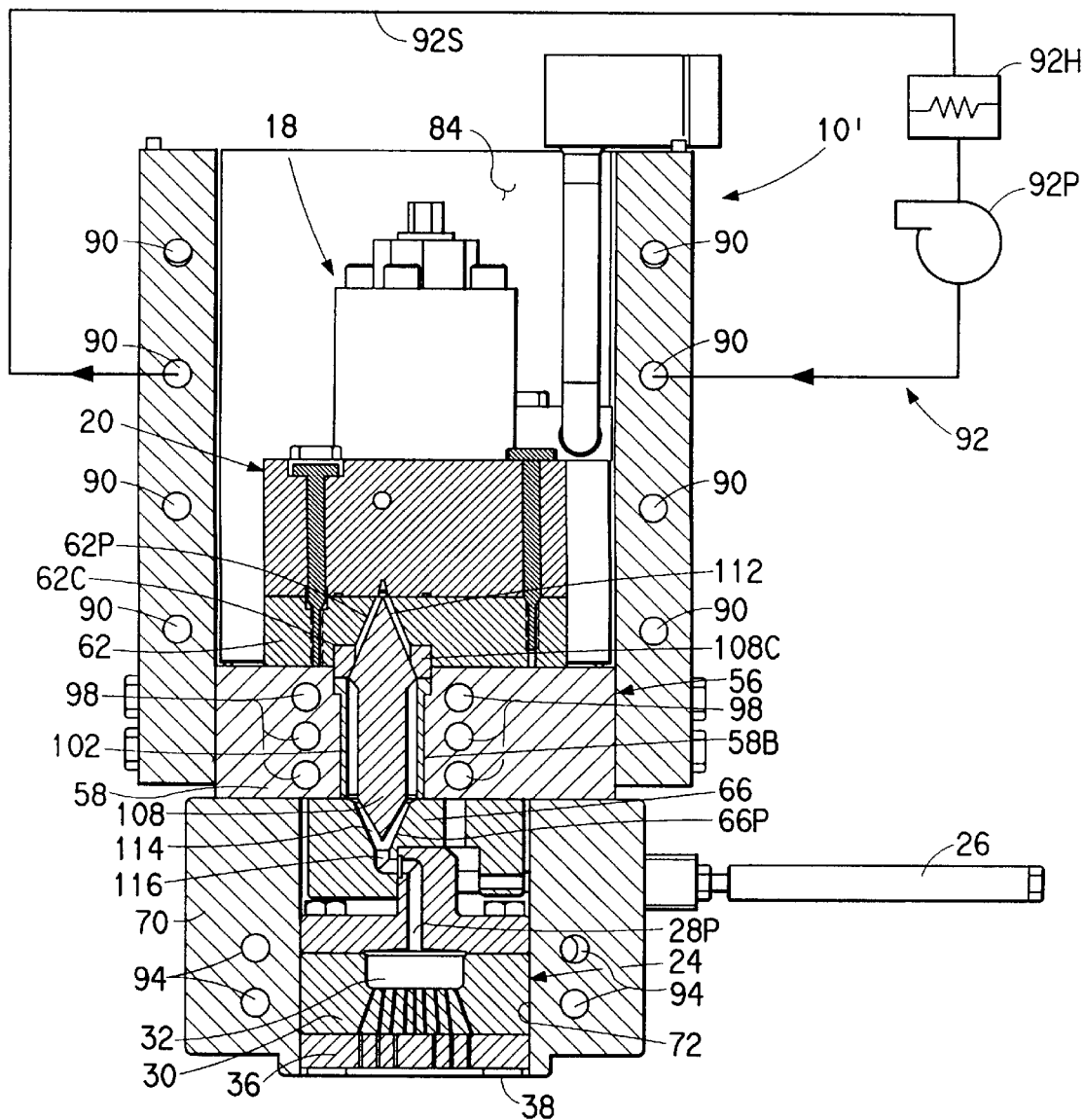
FIGS. 5 and 6 are respectively side and front elevational views, in section, of a spinning apparatus in accordance with the present invention.
Figure 6:
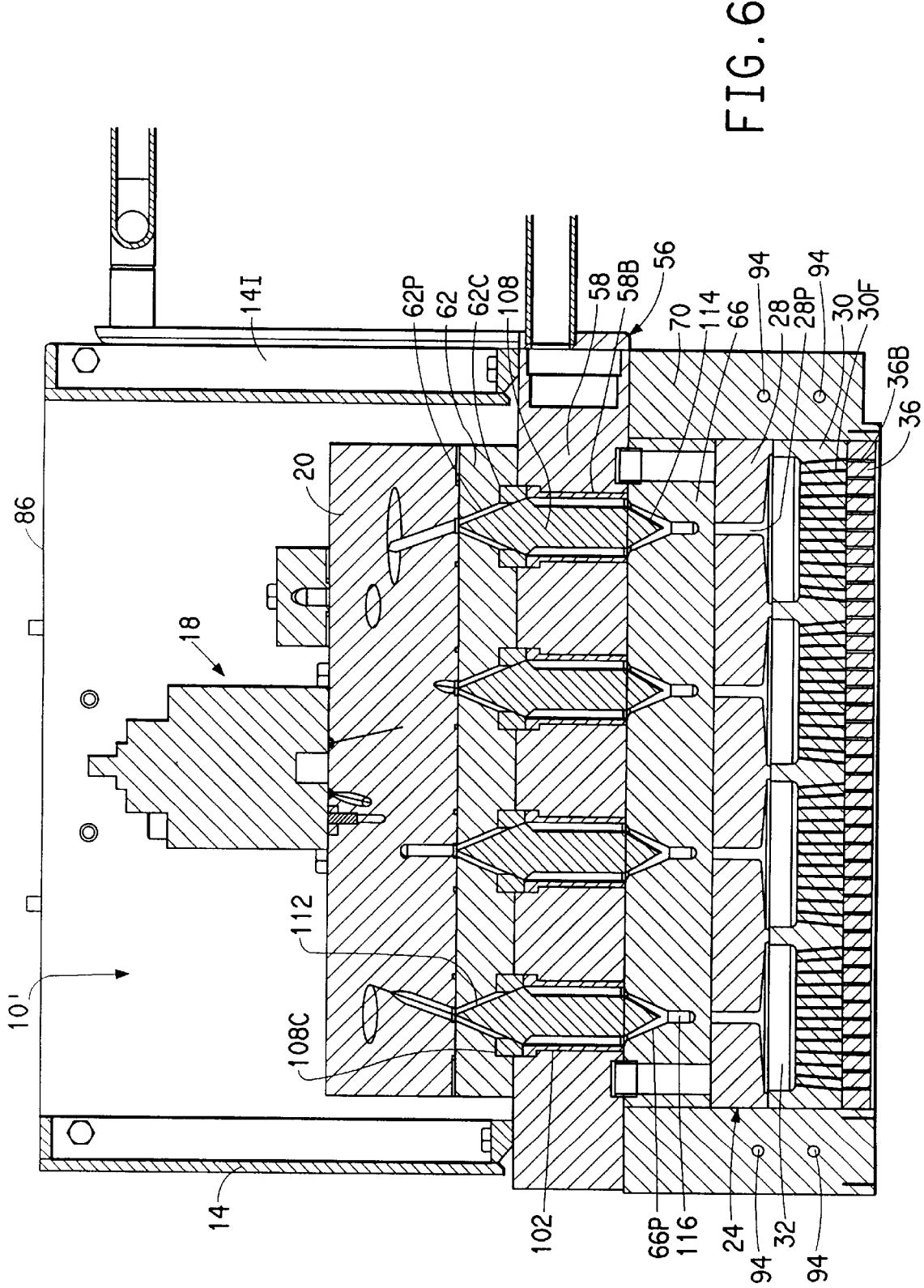

Shown in FIG. 4 is a perspective view illustrating a spin assembly generally indicated by the reference character 50 that includes a side-by-side pair of spinning apparatus 10', each in accordance with the present invention. FIGS. 5 and 6 are respectively, side and front sectional views illustrating the structure of one of the spinning apparatus 10'. The spin assembly 50 may comprise any convenient number of spin apparatus 10'. It should be understood that details of the structure of a spinning apparatus 10' as hereinafter described may be modified from the preferred structural implementation illustrated in the Figures and still remain within the contemplation of the present invention.

As with a prior art spinning apparatus the spinning apparatus 10' includes a pump 18 and associated pump block 20 to supply polymer to a spin pack 24. As seen in FIGS. 5 and 6 each spin pack includes a pack lid 28, a polymer filter holder 30, and a spinneret plate 36. The filter holder 30 holds the polymer filter medium 34. Depending upon the number of threadlines being produced by a given spinning apparatus each spinning apparatus 10' has a number of polymer flow passages formed in the pump block 20 thereof. In the spinning apparatus 10' illustrated in the detailed drawing of FIG. 5 the apparatus 10' produces four separate threadlines. Accordingly, four separate polymer flow passages are seen in the pump block 20. A spinning apparatus 10' in accordance with the present invention may produce any convenient number of threadlines.

Each spinning apparatus 10' includes a plate assembly generally indicated by the reference character 56 that is interposed between the pump block 20 and the spin pack 24. The plate assembly 56 for each spinning apparatus 10' is itself preferably formed as a sandwich structure that includes a central plate member 58, an upper distribution plate member 62, and a lower recombiner plate member 66. Since the central plate member 58 also forms part of the superstructure of the spin assembly 50, for reasons of structural convenience that central plate member 58 may be sized so as to serve in common as the central plate member for all of the spinning apparatus 10' provided in the spin assembly 50.

The spin pack 24 of each spinning apparatus 10' is enclosed within a housing 70 that depends from the plate assembly 56. In the structural implementation illustrated the housing 70 for each spinning apparatus 10' is defined by a portion of an integral piece of stock that is machined or otherwise worked to provide the requisite number of wells 72 needed to accommodate the spin pack 24 of each spinning apparatus 10. In the implementation shown the housing 70 is physically affixed to the undersurface of the central plate member 58. The structure of the spin pack 24 is received within the spin wells 72 so defined and lies within a predetermined close tolerance (on the order of 0.050 inch) of the walls of the housing 70.

The remaining superstructure of the spin assembly 50 is completed by a pair of confronting front and rear panels 74, 76, respectively that are affixed to the lateral margins along the length of the central plate 58. A confronting pair of shorter end panels 78 are affixed to the lateral margins along the width dimension of the central plate 58. A central partition 82 may be disposed across the breadth of the central plate 58. The partition 82, together with the front, rear and end panels 74, 76, and 78, respectively, cooperate to define individual pump wells 84 which receives the pump 18 and pump block 20 of each of the adjacent spinning apparatus 10'. The pump wells 84 may be covered by a common lid plate 86.

For purposes to be more fully described various flow channels are formed in various structural elements of the spin assembly. The front and rear panels have an array of fluid flow channels 90 formed therein. These flow channels 90 in the respective front and rear panels 74, 76 are interconnected into a temperature control arrangement 92 (FIG. 5) that serves to maintain the temperature of the pump wells 84 at a predetermined ambient temperature.

The housing 70 likewise has an array of fluid flow channels 94 formed therein. As will be discussed these channels 94 are interconnected to form part of a temperature control arrangement 96 (FIG. 4) that serves to heat the spin pack 24, and particularly, the periphery of the filter holder 30 and the spinneret plate 36, to a first predetermined reference temperature. As may be observed from close inspection of FIGS. 5 and 6, for flow rate considerations, the size of the channels 90 extending through the longer front and rear portions of the housing 70 are larger than the dimensions of the channels 90 formed in the shorter side portions of the housing 70. The channels 90 through the longer front and rear portions of the housing 70 are preferably formed using a precision drilling technique so that the channels are held straight over their entire length. The channels 90 in the shorter side portions of the housing 70 are also precision drilled and suitably plugged.

The center plate member 58 also has an array of fluid flow channels 98 (FIG. 5) formed therein. These channels 98 are interconnected to form part of a temperature control arrangement 100 (FIG. 4 and 5) that serves to control the temperature of the polymer flowing through flow passages formed in the plate assembly 56 to a predetermined temperature. As will be developed, the temperature control of the polymer between the outlet of the pump 18 and the inlet of the spin pack 24 is effected independently of the temperature control of the spin pack 24 and the filter holder 30 and the spinneret plate 36 therein.

Figure 7:
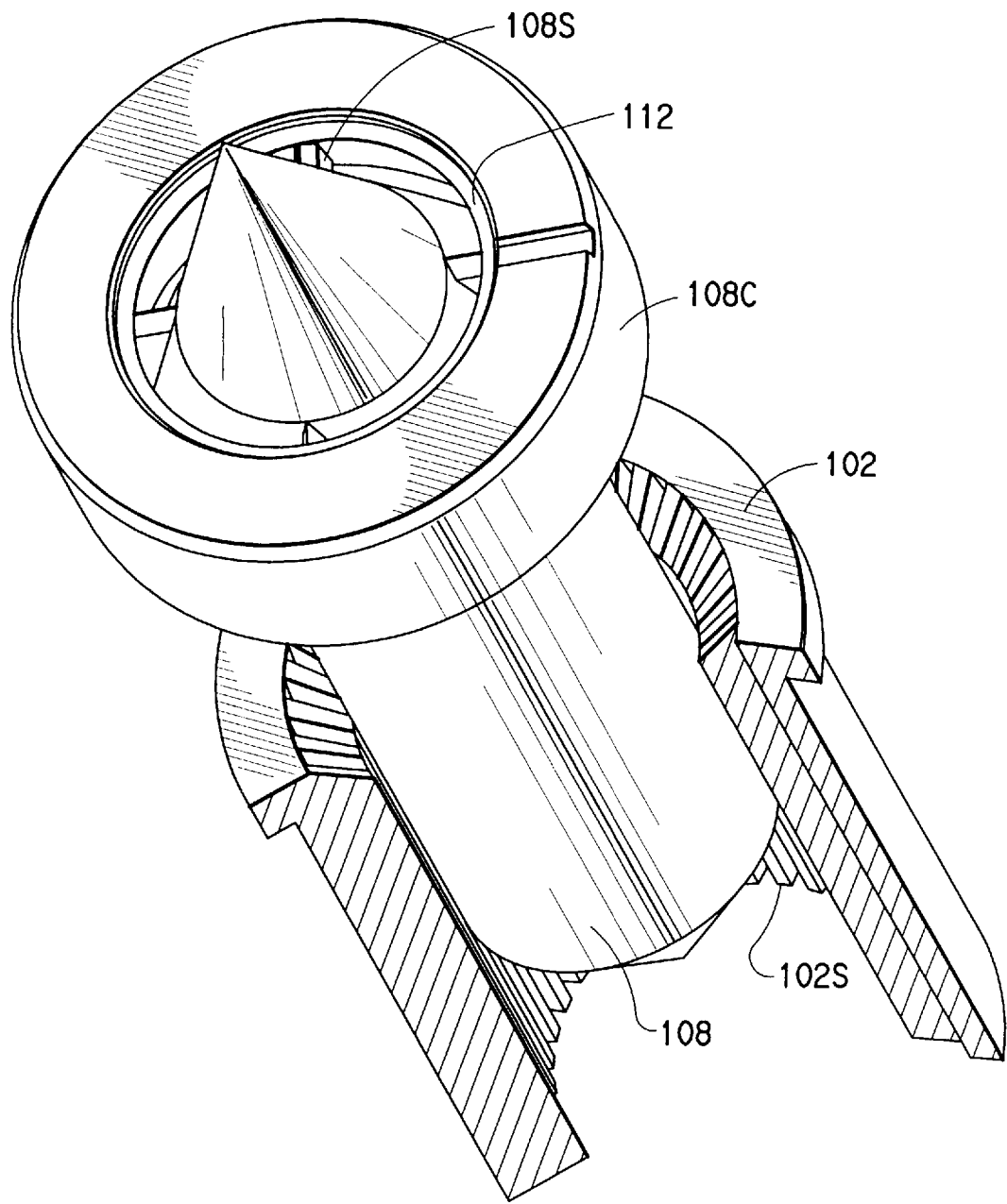
FIG. 7 is an isolated perspective view of a downcomer member disposed within each polymer passage in a central plate assembly of a spinning apparatus of the present invention.
Figure 8:
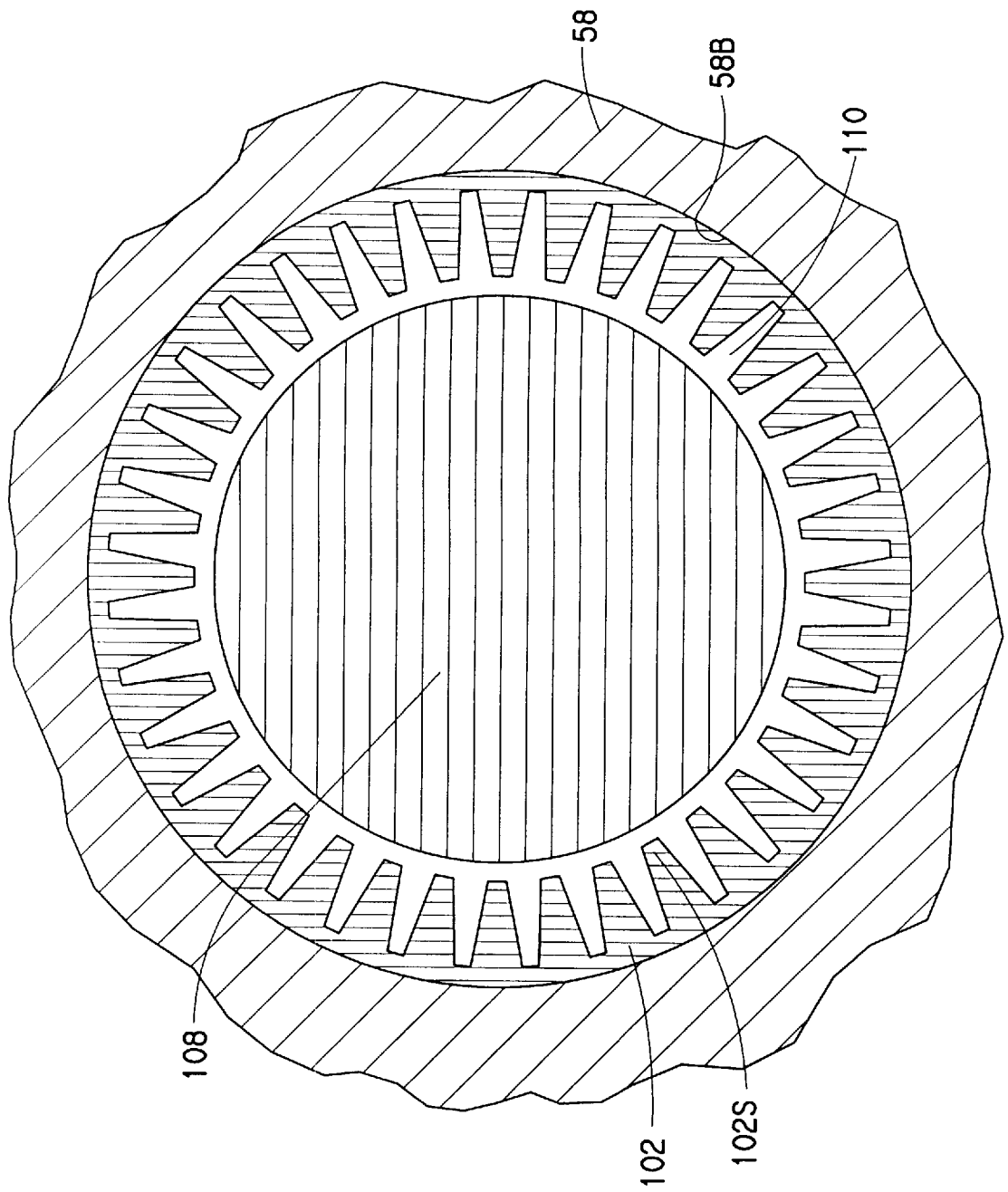
FIG. 8 is a cross section through a portion of a central plate assembly illustrating the relationship of a downcomer member shown in FIG. 7 within a polymer passage in a central plate assembly of a spinning apparatus of the present invention.

The plate assembly 56 disposed between the pump 18 and the spin pack 24 (however the plate assembly is physically configured) includes that number of polymer flow passages needed to connect each of the flow passages in the pump block 20 (and, thus, the outlet of the pump 18) to the inlet of a spin pack 24. As is best seen in FIGS. 7 and 8, in the preferred instance, the central plate 58 has a plurality of through bores 58B formed therein. The upper end of each through bore 58B is counterbored. Each through bore 58B is lined by a sleeve insert 102 that fits in close, thermally conductive contact with the plate 58. The sleeve insert 102, best seen in FIG. 7, is a hollow elongated member that has a smooth outer configuration formed to match the cross section of the through bore 58B in which it is received. The interior of the sleeve insert has a circumferential array of generally axially extending splines 102S that are provided to enhance heat transfer between the material of the plate 58 and polymer passing through the insert 102.

The sleeve insert 102 receives an elongated downcomer pin 108 best illustrated in the perspective view of FIG. 7. The downcomer pin 108 has a generally cylindrically body that tapers toward a point at each end. A circumferentially extending collar 108C is attached by standoffs 108S adjacent the upper tapered end of the downcomer pin 108. The lower surface of the collar 108C supports the downcomer pin 108 in a depending relationship with respect to the splined interior of the sleeve 102 thereby to define a generally annular, elongated flow path 110 therebetween. The radially inside surface of the collar 108C is spaced (via the standoffs 108S) from the exterior surface of the tapered end of the pin 108. The inside surface of the collar 108C is itself tapered to match the taper of the end of the pin, thus forming an annular flow space 112 (FIG. 7) that is in fluid communication with the elongated annular flow path 110 extending along the length of the sleeve 102.

The distribution plate 62 has a downwardly tapering opening 62P formed therein. The dimension of the mouth of the opening 62P in the distribution plate 62 is sized to match closely the dimension of the confronting outlet of the flow passage in the pump block 20 when the pump block 20 and the distribution plate 62 are mounted in adjacency to each other. A counterbore 62C extends into the distribution plate 62 from the lower surface thereof to accommodate the collar 108C of the downcomer pin 108 when the distribution plate 62 is secured to the center plate 58. The taper of the opening 62P in the distribution plate 62 is selected to meld smoothly with the taper of the inside surface of the collar 108C (and thus to match the taper of the upper end of the downcomer pin 108).

The recombiner plate 66 has an upwardly extending tapering opening 66P formed therein. The taper of the opening 66P in the recombiner plate 66 is selected to match the taper of the lower end of the downcomer pin 108. When the recombiner plate 66 is attached to the lower surface of the central plate 58, the tapered lower end of the downcomer pin 108 extends into the tapered opening 66P in the recombiner plate 66. The annular flow space 114 defined between these members communicates with the lower end of the elongated annular flow path 110 through the sleeve 102. The tip of the opening 66P in the recombiner plate 66 is connected by a passage 116 to the inlet opening in the lid of the spin pack 24 (FIG. 5).

Having described the structure of a spinning apparatus 10' in accordance with the invention, a spinning operation may now be discussed.

Molten polymer from the polymer feed line 40 flows via the pump block 20 to the inlet of the meter pump 18. The predetermined polymer inlet temperature at the inlet of the pump is conveniently chosen to define the base temperature used in the various temperature control arrangements deployed by the present invention. Pressurized polymer from the outlet of the pump 18 is forced through the polymer flow passages in the pump block 20 and into the mouth of the tapered opening 62P in the distribution plate 62. Polymer entering the tapered opening 62P in the distribution plate 62 is caused to flow over and about the upwardly projecting tip of the downcomer pin 108. This serves to form the polymer into a generally annular curtain or circular sheet as the polymer is pumped through the space 112 into the elongated annular flow path 110 defined between the downcomer pin 108 and the splines 102S of the insert 102. In the downwardly tapered opening 66P in the recombiner plate 66 the polymer curtain is re-formed into a stream and conveyed into and through the spin pack 24.

As outlined earlier, the shearing and filtering action of the filter 34 in centralized regions of the spin pack 24 generate thermal gradients which cause temperature nonuniformities across the filter holder 30 and the spinneret plate 36. As developed earlier these gradients and temperature nonuniformities in the holder 30 and the plate 36 manifest themselves as temperature nonuniformity among filaments emanating from orifices in various regions of the spinneret plate 36. The present invention minimizes or eliminates such temperature nonuniformity across the holder 30 and the spinneret plate 36 by the use of the temperature control arrangement generally indicated by reference character 96 (FIGS. 4 and 5) that serves to heat the spin pack 24, and particularly, the filter holder 30 and the spinneret plate 36 therein, to a first predetermined reference temperature. The first predetermined reference temperature is greater than the predetermined polymer inlet temperature.

The temperature control arrangement 96 includes the housing 70 and the array of fluid flow channels 94 in the front and sidewall portions thereof which serve as the flow channel through which a heat exchange medium is caused to circulate. External to the spinning assembly 10' the temperature control arrangement 96 includes a closed heat exchange loop having a pump 96P and a heater 96H therein. The array of fluid flow channels 94 in the housing 70 are connected to the external elements in the loop by piping elements 96S, as suggested by the inlet and outlet pipe sections shown in FIG. 4. The heater 96H raises the temperature of the heat exchange medium to at least the first predetermined reference temperature. The heat exchange medium is circulated by the pump 96P through the channels 94 in the housing 70 and serves to heat the spin pack 24, and particularly the filter holder 30 and the spinneret plate 36, to the first predetermined reference temperature.

Figure 3:
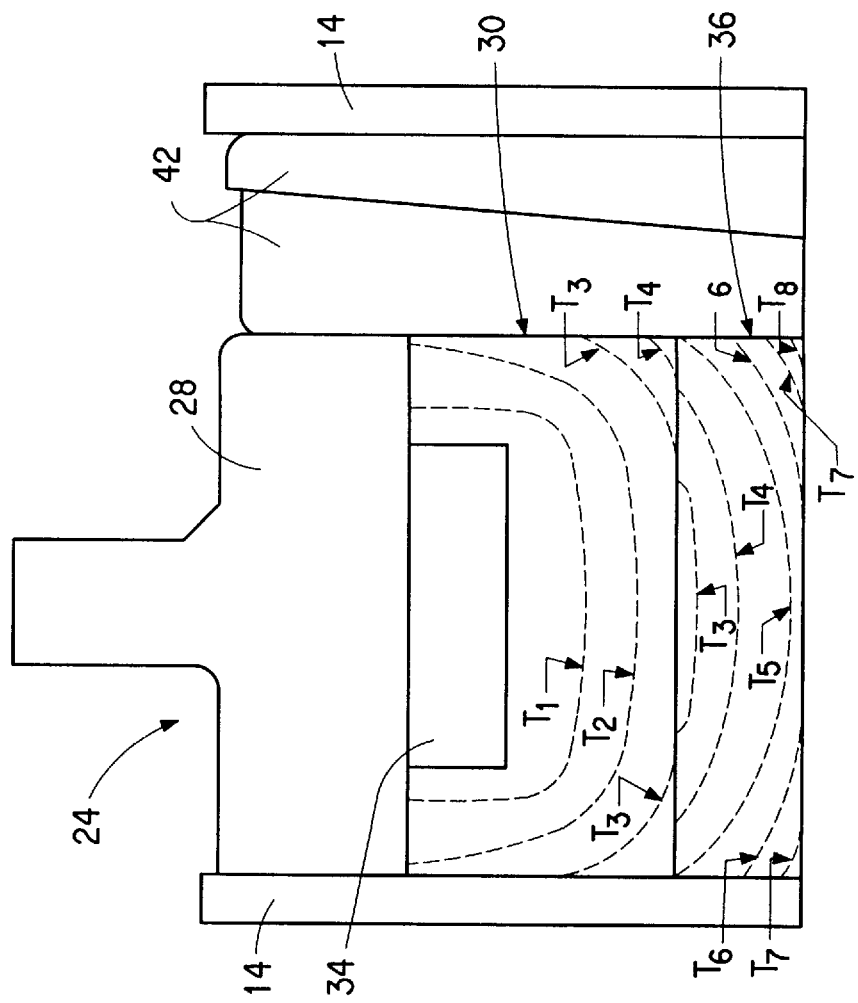
FIG. 3 is a stylized pictorial representation of the thermal variations within a spin pack of the prior art that result in temperature variations among filaments emanating from different regions of a spinneret plate in the prior art spinning apparatus of FIG. 1.
Figure 9B:
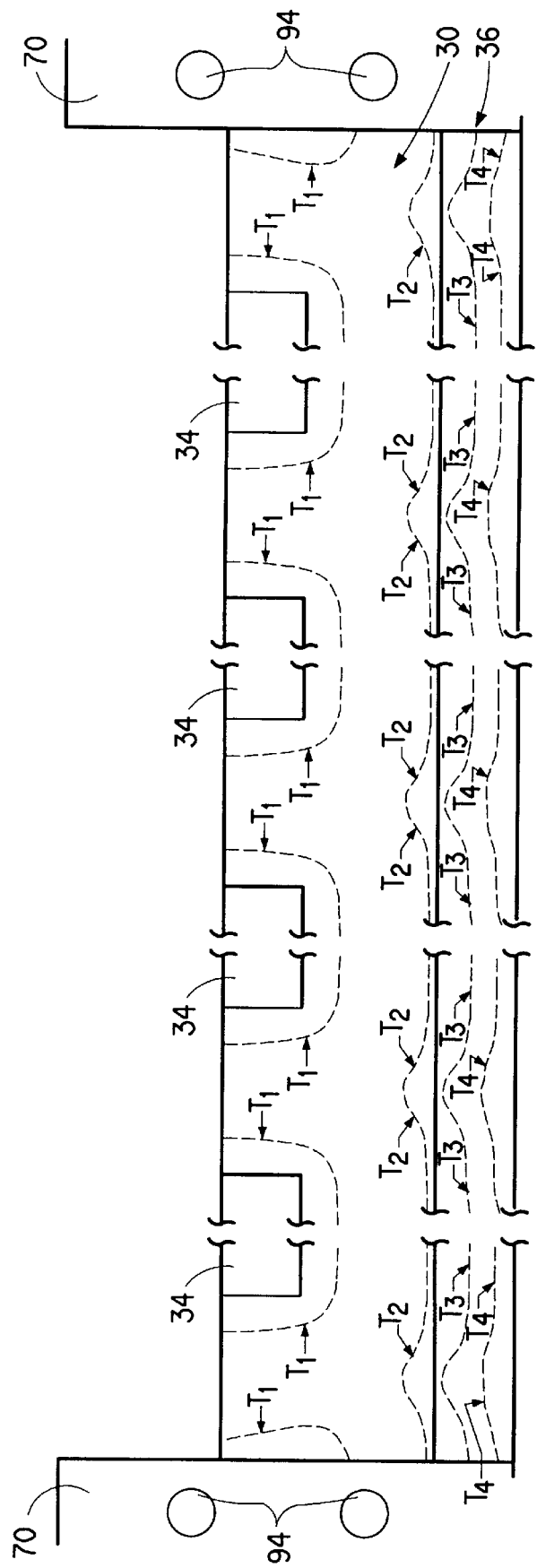

It has been found that heating the filter holder 30 and the spinneret plate 36 minimizes the thermal gradients caused by the shearing and filtering action of the filter 34. This result is graphically illustrated in FIGS. 9A and 9B, which is a stylized pictorial representation similar to FIG. 3 showing the thermal variations within the spin pack 24 of a spinning apparatus 10' in accordance with the present invention. As seen, the temperature differences across the filter holder 30 and the spinneret plate 36 have been substantially minimized, especially as compared to the situation shown in FIG. 3. As a result temperature nonuniformities in filaments emanating from various regions of the spinneret 36 have been substantially reduced.

Although any fluid may be used, the preferred heat exchange medium is oil, such as a dibenzyl toluene compound as that sold by Huls Ag., Marl Germany as MARLOTHERM® SH or a polydimethylsiloxane SYLTHERM® by Dow Corning, Midland, Mich. Other heat exchange fluid media, such as Dow Therm® (the medium used in the prior art) may also be used.

The temperature control arrangement 96 serves to heat the spin pack 24 to a first predetermined reference temperature above the predetermined polymer inlet temperature such that the temperature across the filter holder 30 and the spinneret plate 36 is substantially uniform, whereby the temperature of thermoplastic filaments emanating from the spinneret plate 36 is also substantially uniform.

The advantages gained by minimizing temperature nonuniformity across the filter holder 30 and the spinneret plate 36 may also be gained by localized heating of the housing 70 using an expedient other than the circulation of a fluid heat exchange medium. Accordingly, it lies within the contemplation of the invention to heat the spin pack 24 to the first predetermined reference temperature using electric heaters of any suitable form. Such heaters would be conveniently disposed in the channels 94.

Although raising the temperature of the housing 70 of the spin pack 24 as discussed above is believed, in itself, to result in significant improvement in the operation of a spinning apparatus 10' of the present invention, it is believed that still further improvement may be achieved by also controlling the temperature of the polymer at a point intermediate the pump 18 and the spin pack 24.

A spinning apparatus 10' of the present invention also preferably includes a second temperature control arrangement 100 that serves to control the temperature of the polymer at a point intermediate the pump 18 and the spin pack 24, preferably polymer flowing through the central plate of the plate assembly 58. This temperature control is effected by controlling the temperature of the plate assembly 58 to a second predetermined reference temperature. Because of the presence of a heat exchange element disposed in thermally conductive contact with the plate assembly 58, heat transfer occurs between the plate and the polymer. Thus, the temperature of polymer conveyed through the polymer flow passage in the plate assembly 58 is selectably controllable to a predetermined polymer temperature that lies within a predetermined range of the second predetermined reference temperature. The second predetermined reference temperature of the plate is selectable to a temperature above, equal to, or below the predetermined polymer inlet temperature. The temperature control of the polymer, caused by controlling the temperature of the central plate assembly, occurs independently of the temperature control function imposed by the first temperature control arrangement 92.

The second temperature control arrangement 100 includes a pump 100P for circulating a heat exchange medium through a closed loop flow arrangement formed by external pipe sections 100S (as suggested in FIG. 4) that interconnect with the fluid flow channels 98 formed in the plate assembly 58. The temperature of the heat exchange medium may be adjusted using either an interconnected heater 100H (to raise the temperature of the medium) or a cooler 100C (to lower the temperature of the medium) to a level sufficient to either heat or cool the temperature of the plate to the second predetermined reference temperature. Suitable associated valving is omitted for clarity of illustration.

As noted, the temperature control of the polymer between the pump outlet and the spin pack inlet effected by the second temperature control arrangement 100 is asserted independently of the temperature control of the spin pack 24 as described above. Owing to the presence of either the heater 100H or the cooler 100C, the predetermined reference temperature to which the polymer may be controlled by the second temperature control arrangement is selectable to be either greater than, less than or equal to the predetermined polymer inlet temperature. That is to say, the second predetermined reference temperature may be selectably controlled to any temperature value (including equality) within a predetermined temperature range about the predetermined polymer inlet temperature.

The temperature of the polymer passing through the plate assembly 56 (and particularly the central plate 58) is either raised or lowered, as the case may be, by heat exchange between the heat exchange element provided in the central plate and the polymer flowing through the central plate. In the illustrated embodiment, this heat exchange is enhanced by the splines 102S which increase the heat transfer area between the plate 58 and the polymer. Of course, any other alternative arrangement may be used whereby the desired heat transfer area is achieved between the polymer and the plate 58. Thus, instead of the splined insert 102, the heat exchange element may be implemented using a plurality of bores extending through the central plate 58. Alternatively, the length of the annular flow path may be increased. Instead of areal increases, heat transfer may be enhanced by selecting the material of the region of the plate through which polymer flow occurs in accordance with the material's heat conductivity, or by altering the flow rates of either the heat exchange medium or of the polymer.

Although any heat exchange fluid (including the fluid used in the prior art) may be used to effect in the second temperature control arrangement, the preferred heat exchange medium is again oil, preferably an oil as identified above. Alternatively, electric heaters may also be used.

Figure 10:
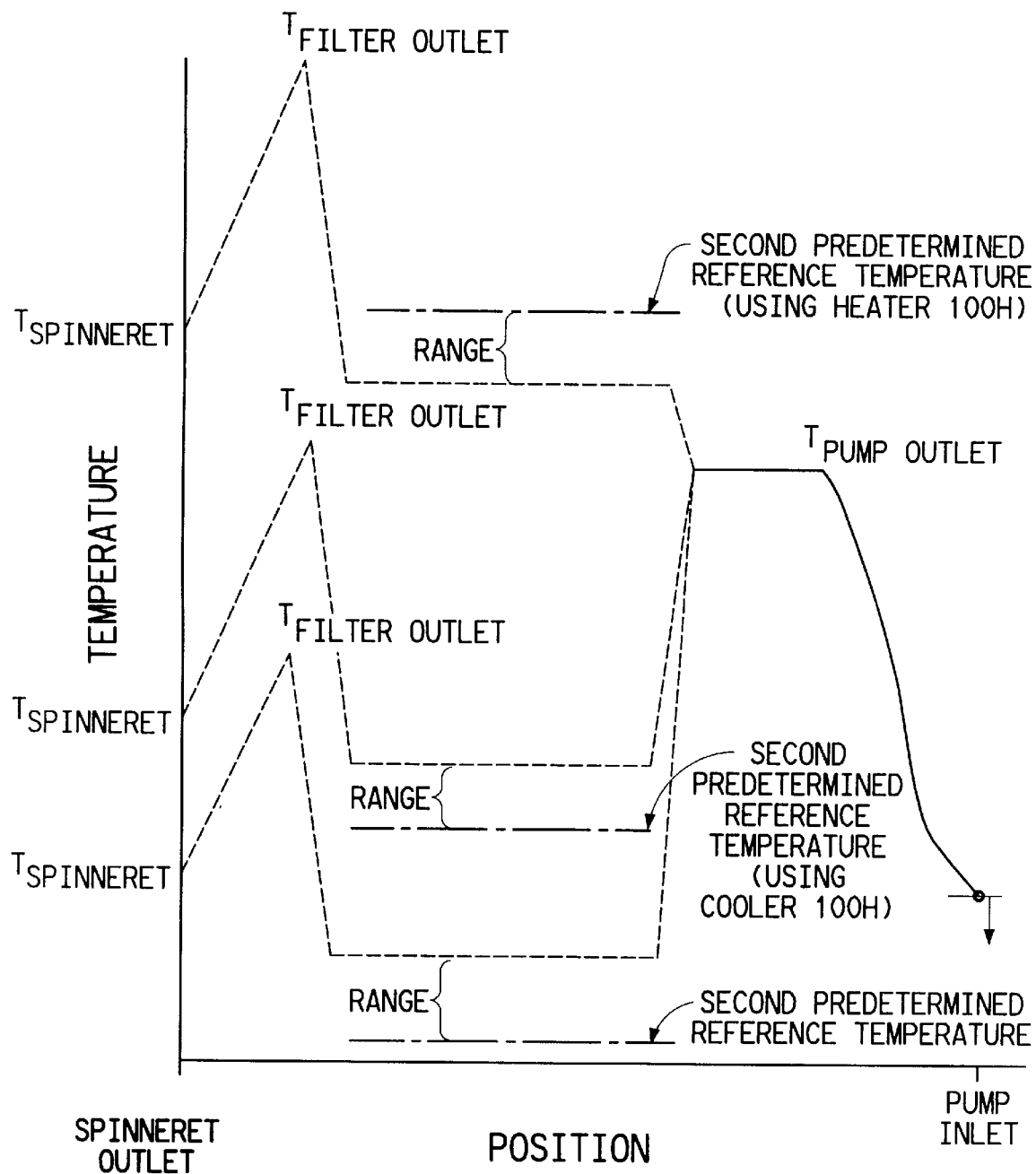
FIG. 10 is a graph similar to FIG. 2 illustrating the thermal experience of the polymeric material forming any given one of the filaments extruded from the face of the spinneret plate of a spinning apparatus in accordance with the present invention.

The effect of the polymer temperature control using the second temperature control arrangement 100 may be understood from the chart of FIG. 10. As seen, the central plate of the plate assembly may be either heated or cooled to the second predetermined reference temperature by the appropriate assertion of either the heater 100H or the cooler 1OOC. As resistance presented by the filter medium increases (either due to filter aging or increased polymer throughput) it may be necessary to adjust the position of the second reference temperature (using either the heater or the cooler) to a level above the temperature of the polymer at the pump outlet, to a level below the temperature of the polymer at the pump outlet and above the polymer inlet temperature, or to a subcooled region in which the temperature is below the polymer inlet temperature. Owing to heat transfer effects, the temperature of the polymer is within a predetermined range of the second predetermined reference temperature.

The temperature of the pump well is maintained at an ambient temperature substantially equal to the polymer inlet temperature by flowing a liquid or gaseous heat exchange medium, such as the oil identified or the fluid used in the prior art, through a closed loop including the channels 90 in the front and rear panels 74, 76. A suitable pump and external piping is provided.

It should be apparent to those skilled in the art that a spinning apparatus in accordance with the present invention can be used in the spinning of any thermoplastic polymer, such as nylon, polyester [including the polyester poly (trimethylene terephthalate), also known as "PTT" or "3GT"], or polypropylene. In addition, the present invention may be used in solution spinning or in melt blow spinning.

It is also to be understood that the base temperature which serves as the baseline definition for both the first and the second predetermined reference temperatures can be other than the polymer inlet temperature.

Those skilled in the art, having the benefit of the teachings of the present invention may impart numerous modifications thereto. Such modifications should be construed to lie within the contemplation of the present invention, as defined by the appended claims.

What is claimed is:

1. Apparatus for spinning filaments of a polymeric material comprising:
   a spin pack including a polymer filter holder and a spinneret plate, the spin pack having a polymer inlet formed therein,
   a pump for pumping a polymeric material having a predetermined polymer inlet temperature through the spin pack to cause the polymeric material to emanate as filaments from the spinneret plate,
   a first temperature control arrangement for heating the spin pack to a first predetermined reference temperature greater than the predetermined polymer inlet temperature such that the temperature across the polymer filter holder and the spinneret plate is substantially uniform, whereby the temperature of the filaments emanating from the spinneret plate is substantially uniform.

2. Apparatus for spinning filaments of a polymeric material comprising:
   a spin pack including a polymer filter holder and a spinneret plate, the spin pack having a polymer inlet formed therein,
   a pump for pumping a polymeric material having a predetermined polymer inlet temperature through the spin pack to cause the polymeric material to emanate as filaments from the spinneret plate, the pump having an outlet port therein,
   a plate assembly disposed between the outlet port of the pump and the inlet of the spin pack, the plate assembly having at least one polymer flow passage formed therein through which polymeric material is able to be conveyed from the outlet port of the pump to the inlet of the spin pack,
   a first temperature control arrangement for heating the spin pack to a first predetermined reference temperature greater than the predetermined polymer inlet temperature such that the temperature across the polymer filter holder and the spinneret plate is substantially uniform, whereby the temperature of the filaments emanating from the spinneret plate is substantially uniform, and
   a second temperature control arrangement for independently controlling the temperature of the plate assembly to a second predetermined reference temperature, the second predetermined reference temperature being selectable to a temperature above, equal to, or below the predetermined polymer inlet temperature, whereby the temperature of polymer conveyed through the polymer flow passage in the plate assembly is selectably controllable to a predetermined polymer temperature lying within a predetermined range of the second predetermined reference temperature.

3. The spinning apparatus of claim 2 further comprising:
   a housing, the spin pack being disposed within the housing, and
   wherein the first temperature control arrangement includes a flow channel disposed within the housing, a pump for circulating a heat exchange medium through the flow channel in the housing, and a heater for heating the heat exchange medium to at least the first predetermined reference temperature.

4. The spinning apparatus of claim 2 further comprising:

a housing, the spin pack being disposed within the housing, and wherein the first temperature control arrangement includes an electric heater element disposed within the housing.

5. The spinning apparatus of claim 2 wherein the second temperature control arrangement includes a flow channel disposed within the plate assembly, and a pump for circulating a heat exchange medium through the flow channel in the plate assembly.

6. The spinning apparatus of claim 5 further comprising a heat transfer element disposed in the plate assembly in thermally conductive contact therewith, the heat transfer element also being disposed in the polymer flow passage for effecting a heat exchange between polymer in the flow passage and the plate assembly.

7. The spinning apparatus of claim 2 wherein the second temperature control arrangement includes an electric heater element disposed within the plate assembly.

8. The spinning apparatus of claim 5 wherein the second temperature control arrangement further comprises:

a cooler for cooling the heat exchange medium to the second predetermined temperature that is below the predetermined polymer inlet temperature.

9. The spinning apparatus of claim 8 further comprising a heat transfer element disposed in the plate assembly in thermally conductive contact therewith, the heat transfer element also being disposed in the polymer flow passage for effecting a heat exchange between polymer in the flow passage and the plate assembly.

10. The spinning apparatus of claim 5 wherein the second temperature control arrangement further comprises:

a heater for heating the heat exchange medium to the second predetermined temperature that is above the predetermined polymer inlet temperature.

11. The spinning apparatus of claim 10 further comprising a heat transfer element disposed in the plate assembly in thermally conductive contact therewith, the heat transfer element also being disposed in the polymer flow passage for effecting a heat exchange between polymer in the flow passage and the plate assembly.

12. The spinning apparatus of claim 2, further comprising a heat transfer element disposed in the plate assembly in thermally conductive contact therewith, the heat transfer element also being disposed in the polymer flow passage for effecting a heat exchange between polymer in the flow passage and the plate assembly.

13. The spinning apparatus of claim 12 wherein the plate assembly has an opening therethrough, wherein the heat exchange element comprises a hollow sleeve having an interior bore extending therethrough, the sleeve being intimately received in the opening in the plate assembly in a heat transfer relationship therewith, the bore of the sleeve being lined by a series of splines, the heat exchange element further comprises an elongated pin member supported by the plate assembly to extend through the bore of the sleeve in spaced relationship with the splines, the pin member and the splines in the central plate cooperating to define a heat exchange annulus therebetween, the heat exchange annulus in the plate assembly defining at least a portion of the polymer flow passage extending through the plate assembly.

14. A method for spinning a filament of a polymeric material comprising the steps of:

a) pumping a polymeric material having a predetermined polymer inlet temperature from a pump through a spin pack having a polymer filter holder and a spinneret plate therein to cause the polymeric material to emanate as filaments from the spinneret plate; and b) controlling the temperature of the spin pack to a first predetermined reference temperature greater than the predetermined polymer inlet temperature such that the temperature across the polymer filter holder and the spinneret plate is substantially uniform, whereby the temperature of the filaments emanating from the spinneret plate is substantially uniform.

15. A method for spinning a filaments of a polymeric material comprising the steps of:

a) pumping a polymeric material having a predetermined polymer inlet temperature from a pump through a spin pack having a polymer filter holder and a spinneret plate therein to cause the polymeric material to emanate as filaments from the spinneret plate;

b) controlling the temperature of the spin pack to a first predetermined reference temperature greater than the predetermined polymer inlet temperature such that the temperature across the polymer filter holder and the spinneret plate is substantially uniform, whereby the temperature of the filaments emanating from the spinneret plate is substantially uniform;

c) at a point intermediate the pump and the spin pack, separately controlling the temperature of the polymer passing through the spinneret plate to a polymer temperature lying within a predetermined range of a second predetermined reference temperature, said second predetermined reference temperature being selectably controllable to a temperature above, equal to, or below the predetermined polymer inlet temperature.

16. The method of claim 15, wherein the spin pack is disposed within a housing, and wherein the step b) comprises the step of circulating a heat exchange medium having a temperature at least equal to the first predetermined reference temperature through a flow channel in the housing.

17. The method of claim 15, wherein a plate assembly is disposed between the pump and the spin pack, and wherein the step c) comprises the step of circulating a heat exchange medium through a flow channel in the plate assembly to control the temperature of the plate assembly to the second predetermined reference temperature.

* * * * *

UNITED STATES PATENT AND TRADEMARK OFFICE
CERTIFICATE OF CORRECTION

PATENT NO. : 5,866,050

DATED : February 2, 1999

INVENTOR(S) : Leland Luper Krauss, et al.

It is certified that error appears in the above-identified patent and that said Letters Patent is hereby corrected as shown below:

Column 12, line 15, delete "a" (first occurrence).

Signed and Sealed this

Twenty-second Day of June, 1999

Attest:

Q. TODD DICKINSON

*Attesting Officer*      *Acting Commissioner of Patents and Trademarks*